United States Patent
Clarke et al.

(10) Patent No.: US 7,564,482 B2
(45) Date of Patent: Jul. 21, 2009

(54) IMAGE CAPTURING DEVICE, CORRECTION DEVICE, MOBILE PHONE, AND CORRECTING METHOD

(75) Inventors: Ian Clarke, Ontario (CA); Eunice Poon, Ontario (CA)

(73) Assignee: Seiko Epson Corporation, Tokyo (JP)

( * ) Notice: Subject to any disclaimer, the term of this patent is extended or adjusted under 35 U.S.C. 154(b) by 512 days.

(21) Appl. No.: 11/318,470

(22) Filed: Dec. 28, 2005

(65) Prior Publication Data

US 2006/0170784 A1    Aug. 3, 2006

(30) Foreign Application Priority Data

Dec. 28, 2004    (JP) ................. P2004-379222

(51) Int. Cl.
*H04N 5/228* (2006.01)
(52) U.S. Cl. .................................. 348/208.1
(58) Field of Classification Search ................ 348/153, 348/154, 208.99, 208.1–208.16, 218.1
See application file for complete search history.

(56) References Cited

U.S. PATENT DOCUMENTS

2002/0163581 A1*  11/2002  Kitazawa et al. ......... 348/208.6
2003/0002746 A1*   1/2003  Kusaka ...................... 382/255
2003/0076408 A1*   4/2003  Dutta ........................... 348/61
2003/0202115 A1*  10/2003  Sugimoto et al. ........... 348/362
2004/0170326 A1*   9/2004  Kataoka et al. ............. 382/209
2005/0030389 A1*   2/2005  Katsuki .................... 348/222.1

FOREIGN PATENT DOCUMENTS

JP    2-239781 A    9/1990

* cited by examiner

*Primary Examiner*—Tuan V Ho
*Assistant Examiner*—Joel Fosselman
(74) *Attorney, Agent, or Firm*—Sughrue Mion, PLLC

(57) ABSTRACT

An image capturing device is adapted to capture an object image and to generate an image data. Each of a plurality of image capturers is adapted to perform an image capturing of a part of the object image and to generate a partial image data which constitutes a part of the image data based on the part of the object image. Each of the image capturers has an optical axis. A detector is operable to detect movement of each of the image capturers in a direction perpendicular to the optical axis during the image capturing and to generate movement data based on the detected movement, for each of the image capturers. A processor is operable to correct the partial image data so as to compensate the movement during the image capturing based on the movement data.

9 Claims, 10 Drawing Sheets

FIG. 3

| X-AXIS DATA | | Y-AXIS DATA | |
|---|---|---|---|
| SAMPLE NUMBER | VALUE | SAMPLE NUMBER | VALUE |
| 333 | 1539 | 333 | 1518 |
| 334 | 1546 | 334 | 1518 |
| 335 | 1554 | 335 | 1519 |
| 336 | 1558 | 336 | 1521 |
| 337 | 1560 | 337 | 1524 |
| 338 | 1559 | 338 | 1530 |
| 339 | 1560 | 339 | 1532 |
| 340 | 1556 | 340 | 1541 |
| 341 | 1551 | 341 | 1549 |
| 342 | 1545 | 342 | 1560 |
| 343 | 1537 | 343 | 1568 |
| 344 | 1530 | 344 | 1568 |
| 345 | 1523 | 345 | 1569 |
| 346 | 1518 | 346 | 1572 |
| 347 | 1521 | 347 | 1569 |
| 348 | 1527 | 348 | 1564 |
| 349 | 1530 | 349 | 1564 |
| 350 | 1535 | 350 | 1555 |
| 351 | 1536 | 351 | 1550 |
| 352 | 1536 | 352 | 1544 |
| 353 | 1537 | 353 | 1538 |
| 354 | 1538 | 354 | 1532 |
| 355 | 1538 | 355 | 1530 |
| 356 | 1540 | 356 | 1530 |
| 357 | 1544 | 357 | 1529 |
| 358 | 1547 | 358 | 1535 |
| 359 | 1550 | 359 | 1539 |
| 360 | 1553 | 360 | 1545 |
| 361 | 1553 | 361 | 1553 |
| 362 | 1550 | 362 | 1560 |
| 363 | 1547 | 363 | 1570 |
| 364 | 1540 | 364 | 1582 |

FIG. 8

| SEGMENT NUMBER | GYRO DATA SAMPLE NUMBER | HAND-SHAKE AMOUNT (PIXEL) | HAND-SHAKE DIRECTION (DEGREE) |
|---|---|---|---|
| 1 | 333~349 | 2 | 7.59 |
| 2 | 334~350 | 2 | 2.46 |
| 3 | 335~351 | 3 | 1.88 |
| 4 | 336~352 | 3 | 5.92 |
| 5 | 337~353 | 3 | 9.62 |
| 6 | 338~354 | 3 | 13.16 |
| 7 | 339~355 | 3 | 16.66 |
| 8 | 340~356 | 3 | 19.83 |
| 9 | 341~357 | 3 | 22.47 |
| 10 | 342~358 | 3 | 24.18 |
| 11 | 343~359 | 2 | 23.98 |
| 12 | 344~360 | 2 | 20.69 |
| 13 | 345~361 | 2 | 13.34 |
| 14 | 346~362 | 1 | 3.24 |
| 15 | 347~363 | 1 | 5.64 |
| 16 | 348~364 | 2 | 10.22 |

FIG. 10

| 0 | 0 | 0 | a1 | a2 |
|---|---|---|----|----|
| 0 | 0 | a1 | a2 | 0 |
| 0 | a2 | a1 | 0 | 0 |
| 0 | a2 | a1 | 0 | 0 |
| a2 | a1 | 0 | 0 | 0 |

IMAGE CAPTURING DEVICE, CORRECTION DEVICE, MOBILE PHONE, AND CORRECTING METHOD

BACKGROUND OF THE INVENTION

The present invention relates to an image capturing device, a correction device, a mobile phone, performing correction on a captured image affected by hand-shake, and a correcting method.

There has been proposed a technology of detecting movement information concerning the movement of a camera, and, on the basis of the movement information, reducing an effect of hand-shake on an image captured by an image capturing element (for example, see JP-A-2-239781).

When the hand-shake amount and the hand-shake direction are constant in an image on a sheet, the hand-shake can be corrected through the above-mentioned method set forth in the related art. However, when the hand-shake amount and the hand-shake direction is not constant in an image on a sheet, the image includes both a part where the hand-shake is properly corrected and a part where the handshake is not properly corrected.

When a rolling shutter is taken as an example, a capturing timing of each part of the image on a sheet may be different from each other, and the hand-shake amount and the hand-shake direction may not be constant in the image on a sheet.

SUMMARY

It is therefore an object of the present invention to provide an image capturing device, a correction device, a mobile phone, and a correcting method, which can correct the hand-shake even though the hand-shake amount and the hand-shake direction is not constant in an image on a sheet.

In order to achieve the object, according to the invention, there is provided an image capturing device, adapted to capture an object image and to generate an image data, the image capturing device comprising:

a plurality of image capturers, each of which is adapted to perform an image capturing of a part of the object image and to generate a partial image data which constitutes a part of the image data based on the part of the object image, each of the image capturers having an optical axis;

a detector, operable to detect movement of each of the image capturers in a direction perpendicular to the optical axis during the image capturing and to generate movement data based on the detected movement, for each of the image capturers; and a processor, operable to correct the partial image data so as to compensate the movement during the image capturing based on the movement data.

With this configuration, since the correction is performed on each partial area of the object image on a sheet, it is possible to correct the handshake even though the hand-shake amount and the hand-shake direction are not constant for each part of the image on a sheet.

According to the invention, there is also provided a correction device, adapted to correct image data corresponding to an object image, the correction device comprising:

a first storage, storing partial image data each of which constitutes a part of the image data and is generated by each of image capturers having an optical axis;

a second storage, storing movement data each of which is based on movement of each of the image capturers in a direction perpendicular to the optical axis during an image capturing of a part of the object image performed by each the image capturers for each of the image capturers; and a processor, correcting each of the partial image data stored in the first storage so as to compensate the movement of each of the image capturers based on each of the movement data stored in the second storage.

With this structure, since the correction process is performed on each partial area of the object image on a sheet, it is possible to correct the hand-shake even though the hand-shake amount and the hand-shake direction are not constant for each part of the image on a sheet.

According to the invention, there is also provided a mobile phone, operable to capture an object image and to generate an image data, the mobile phone comprising:

a plurality of image capturers, each of which is fixed in a housing and is adapted to perform an image capturing of a part of the object image and to generate a partial image data which constitutes a part of the image data based on the part of the object image, each of the image capturers having an optical axis;

a first gyro sensor, fixed in the housing, and operable to detect a first angular velocity of each of the image capturers around a first axis that is perpendicular to the optical axis during the image capturing;

a second gyro sensor, fixed in the housing, and operable to detect a second angular velocity of each of the image capturers around a second axis that is perpendicular to the optical axis and the first axis during the image capturing; and a processor, correcting the partial image data in association with the first angular velocity and the second angular velocity.

With this structure, by the use of the gyro sensor, it is possible to detect the movement of the image capturer in a narrow housing of the mobile phone. Further, since the correction can be easily realized and can be performed on each partial area of the object image on a sheet, it is possible to advantageously correct the hand-shake even though the hand-shake amount and the hand-shake direction are not constant for each part of the image on a sheet.

According to the invention, there is also provided a correcting method for image data corresponding to an object image, the correcting method comprising:

performing an image capturing of a part of the object image by each of image capturers having an optical axis, generating a partial image data which constitutes a part of the image data based on the part of the object image, detecting movement of each of the image capturers in a direction perpendicular to the optical axis;

generating movement data based on the detected movement; and correcting the partial image data so as to compensate the movement during the image capturing based on the movement data.

With this structure, since the correction process is performed on each partial area of the object image on a sheet, it is possible to advantageously correct the hand-shake even though the hand-shake amount and the hand-shake direction are not constant for each part of the image on a sheet.

BRIEF DESCRIPTION OF THE DRAWING

FIG. 3 is a table showing an example of the gyro data according to the first embodiment.

FIG. 8 is a table showing an example of the hand-shake amount and the hand-shake direction that are calculated in the first embodiment.

FIG. 10 is a diagram showing an example of a filter in the first embodiment.

DETAIL DESCRIPTION OF PREFERRED EMBODIMENTS

Embodiments according to the present invention will now be described with reference to the accompanying drawings.

First Embodiment

Figure 1:
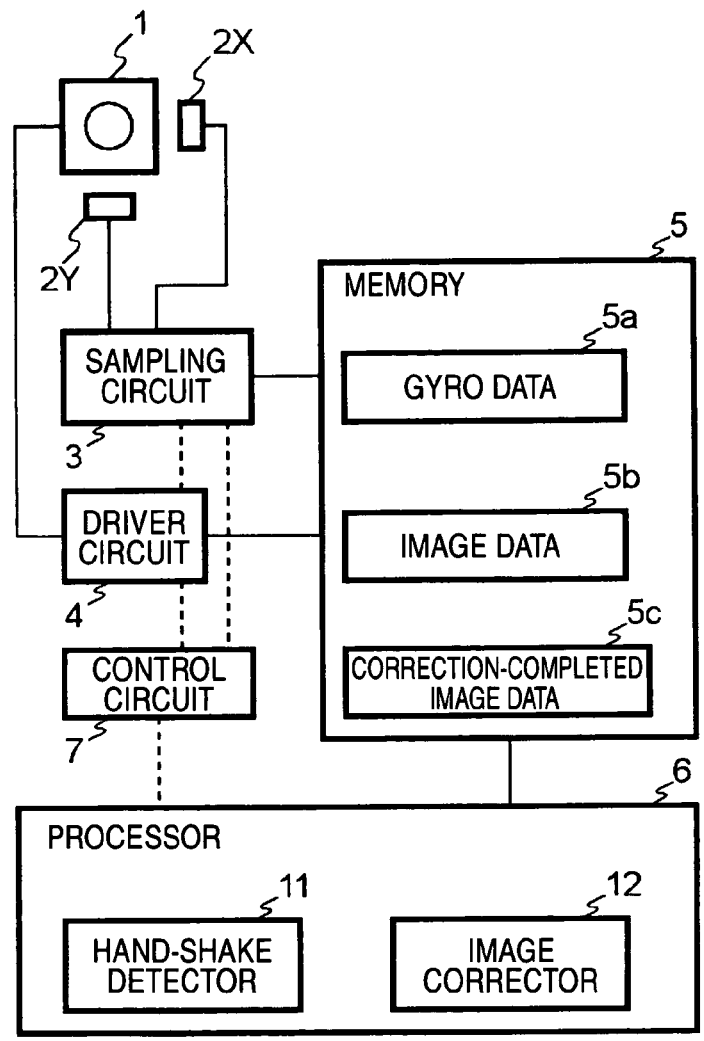
FIG. 1 is a block diagram of an image capturing device according to a first embodiment of the present invention.

The image capturing device shown in FIG. 1 is a portable image capturing device such as a digital still camera. In FIG. 1, a camera 1 includes an image capturing element, such as a CCD (charge coupled device) sensor or a CMOS sensor, and an optical system, such as a lens that projects a subject image on a surface of the image capturing element. The camera 1 is fixed to a housing of the image capturing device or a member provided in the housing. Thus, the image capturing element provided in the camera 1 is fixed within the housing, and moves in the same way as the image capturing device in a third dimensional space.

A sensor 2X is a movement detector that detects the movement of the image capturing element of the camera 1 in a direction (hereinafter, referred to as X-axis) perpendicular to an optical axis of the optical system of the camera 1 including the image capturing element. A sensor 2Y is a movement detector that detects the movement of the image capturing element of the camera 1 around a direction (hereinafter referred to as Y-axis) perpendicular to both the X-axis and the optical axis of the optical system of the camera 1 including the image capturing element.

Similarly to the camera 1, the sensors 2X and 2Y are fixed to the housing of the image capturing device or a member provided in the housing. Thus, the sensors 2X and 2Y move in the same way as the image capturing device. Further, corresponding to the movement of the image capturing device, the sensors 2X and 2Y move in the same way as the camera 1.

In the first embodiment, the sensors 2X and 2Y are gyro sensors that detect the angular velocity of the image capturing element rotating around the X-axis and the Y-axis. That is, analog values of the voltage, current, and resistance generated in the sensors 2X and 2Y change depending on the angular velocity of the sensors 2X and 2Y. In addition, information concerning the absolute angular velocity is obtained by the sensors 2X and 2Y. An example of the gyro sensor includes a vibrating gyro sensor 'XV-3500CB', which has been developed by the present applicants. The vibrating gyro sensor 'XV-3500CB' has a dimension of 5.0 mm×3.2 mm×1.3 mm and a weight of 66 mg. Since such a compact, thin gyro sensor is used, the sensors 2X and 2Y can be provided in a narrow housing. In addition, when the first embodiment is applied to a mobile phone equipped with a camera, the sensors 2X and 2Y can be reliably provided in a narrow housing of the mobile phone.

Figure 2:
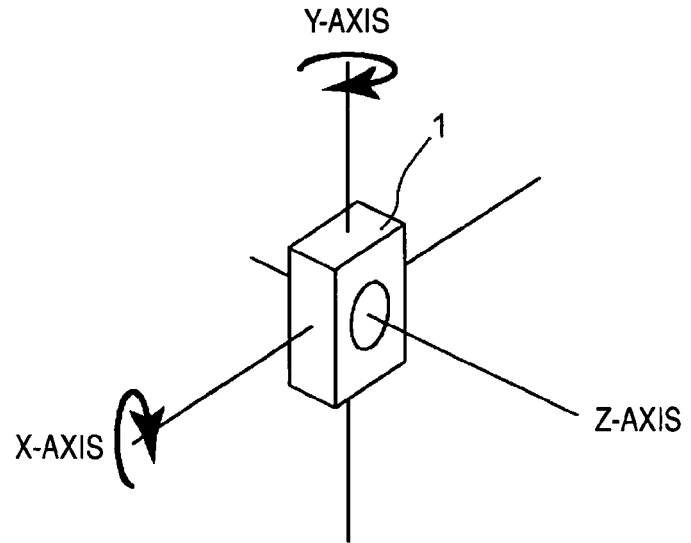
FIG. 2 is a perspective view showing the directions of angular velocity detected by sensors according to the first embodiment.

As shown in FIG. 2, when an optical axis of an optical system of the camera 1 is set to the Z-axis, the sensor 2X detects the angular velocity of the camera 1 around the X-axis of FIG. 2, and the sensor 2Y detects the angular velocity of the camera 1 around the Y-axis of FIG. 2.

Referring to FIG. 1, a sampling circuit 3 converts analog values of the voltage, current, and resistance generated in the sensors 2X and 2Y into digital values, and acquires movement data concerning the movement of the camera 1. In the first embodiment, since the sensors 2X and 2Y detect the angular velocity, the movement data is data concerning the angular velocity.

The sampling circuit 3 repeatedly performs sampling of values detected by the sensors 2X and 2Y at a predetermined sampling rate. In the first embodiment, the sampling rate of the sampling circuit 3 is set to be greater than the frame rate (a reciprocal of time required for capturing an image on a sheet) at the time when a rolling shutter is operated by a driver circuit 4.

In addition, the sampling circuit 3 stores as gyro data 5a the angular velocity data detected by the sensors 2X and 2Y in a memory 5, in association with each time at which the camera 1 captures an image.

As shown in FIG. 3, the gyro data 5a includes sample number, X-axis angular velocity data, and Y-axis angular velocity data with respect to each of samples obtained by the sensors 2X and 2Y. Each sample is sequentially generated according to the sampling rate and is given a sample number that is incremented one by one. For example, in FIG. 3, a sample that is given a sample number of 333 has X-axis angular velocity data of 1539 and Y-axis angular velocity data of 1518.

In the first embodiment, the angular velocity data, which is stored as the gyro data 5a, becomes RAW data outputted from the sensors 2X and 2Y, and, when calculating using the angular velocity data, the RAW data is converted to an angular velocity value. In addition, the angular velocity value converted from the RAW data may be stored as angular velocity data of the gyro data 5a. The conversion from the RAW data into the angular velocity value may be performed on the basis of well-known characteristics of the sensors 2X and 2Y.

Referring to FIG. 1, the driver circuit 4 acquires image data 5b from the image capturing element of the camera 1 and stores it in the memory 5. In the first embodiment, the driver circuit 4 changes a capturing timing every single or plural lines of the image capturing element of the camera 1, and acquires the image data from each line to realize the rolling shutter.

In addition, the memory 5 is a semiconductor memory, such as RAM, EEPROM (electronic erasable programmable ROM), and flash memory. The memory 5 stores the gyro data 5a, the image data 5b, and correction-completed image data 5c. A recording medium such as a hard disk drive may be used instead of the memory 5.

Figure 4:
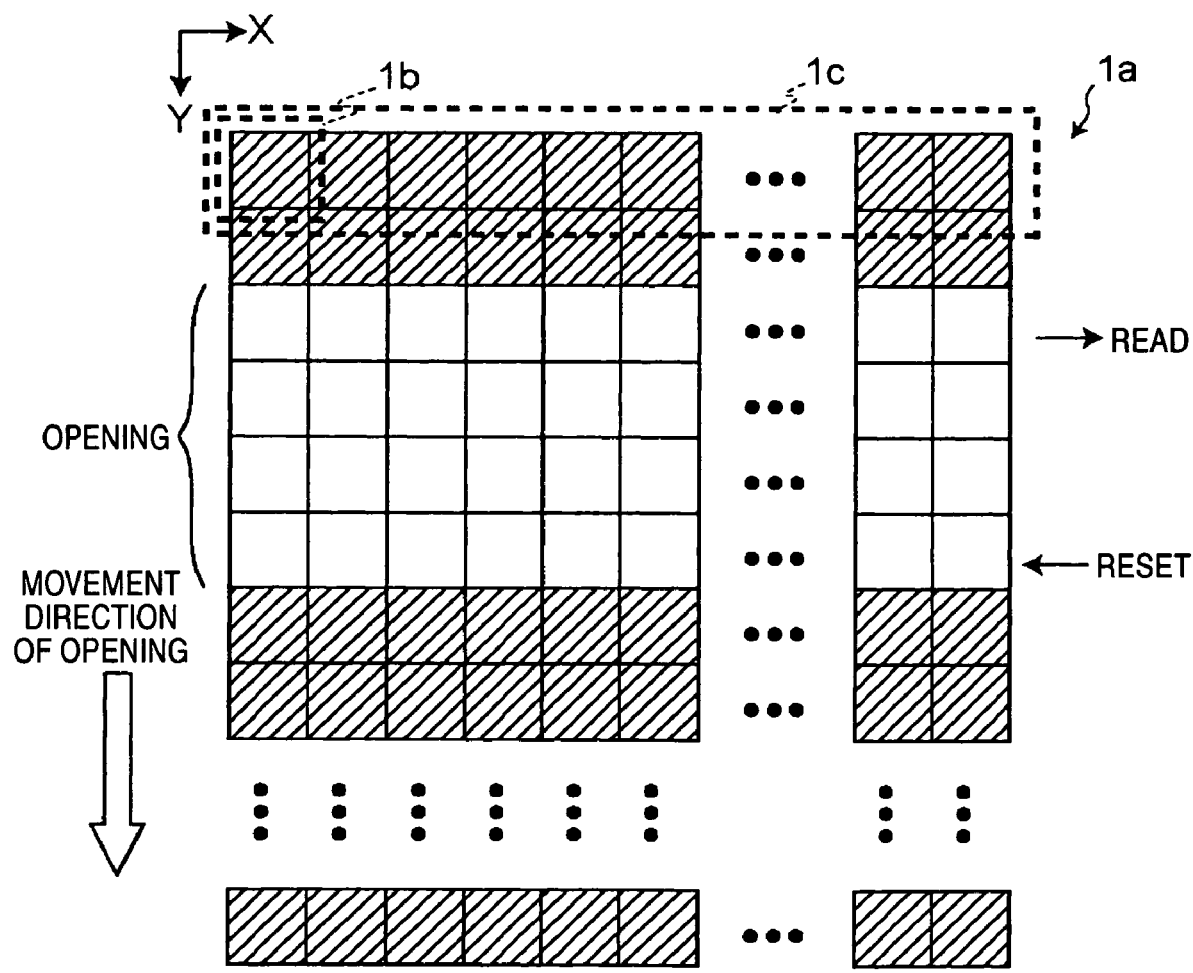
FIG. 4 is a diagram for explaining a rolling shutter realized in the first embodiment.

As shown in FIG. 4, an image capturing element 1a of the camera 1 is configured such that light-receiving units 1b each corresponding to a single pixel are arranged in a two dimension. A line 1c is a set of the image capturing element 1a arranged in one arrangement direction.

Each light-receiving unit 1b generates electrical charge and voltage depending on the amount of incident light. Distribution of charge and voltage of the light-receiving unit 1b arranged in the two dimension forms image information. The image information is acquired from each line $1c$ of the image capturing element $1a$. The image information having an analog value of each line $1c$ is converted by the driver circuit 4 to image data having a digital value. The converted image data is stored in the memory 5.

The charge and voltage of the light-receiving unit $1b$ are reset at reset timing line by line. The charge and voltage of the light-receiving unit $1b$ are acquired at a read timing after a predetermined time has elapsed. That is, a time period between the reset timing and the read timing forms an exposure time of the line $1c$.

In case of the rolling shutter, when light corresponding to a subject image is incident on a surface of the image capturing element $1a$ through an optical system of the camera 1, the driver circuit 4 exposes each line $1c$ with a constant time period while changing the reset timing and the read timing every single or plural lines $1c$, and then acquires image information of each line $1c$. Accordingly, in case of the rolling shutter, the shutter is realized by moving a pseudo opening in the arrangement direction of the line $1c$.

In this way, in case of the rolling shutter, the opening moves in a direction perpendicular to the line of the image capturing element $1a$ with time. For this reason, while the capturing timing in the line is the same, the capturing timing in an image on a sheet is different depending on parts of the image. If the velocity or angle of hand-shake varies with time during capturing, the hand-shake amount and/or the hand-shake direction varies depending on parts of the image.

Figure 5:
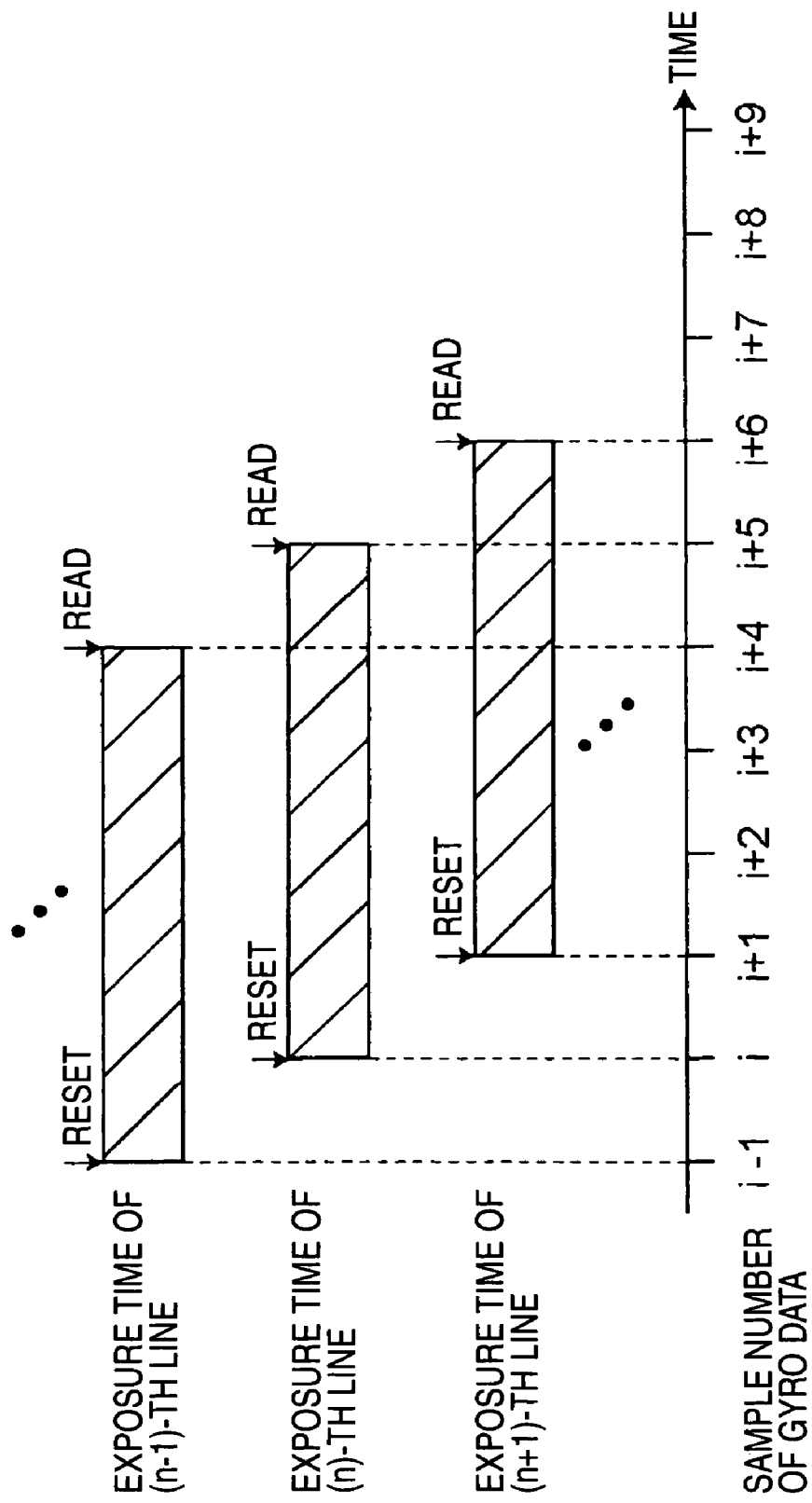
FIG. 5 is a timing chart showing the relationship between the capturing timing and the gyro data in the first embodiment.

As shown in FIG. 5, the sample of the gyro data $5a$ is related to the time period from the resetting of the line $1c$ to the reading of the line $1c$. In FIG. 5, samples of the gyro data $5a$ corresponding to the sample numbers (i) to (i+5) are related to image data of the (n)-th line.

Referring to FIG. 1, a processor 6 is a circuit or device that performs a hand-shake correction process on image data of each of partial images, which are obtained by dividing the image on a sheet captured by the camera 1 into a plurality of partial areas, on the basis of angular velocity data indicating the movement of the camera 1 detected by the sensors 2X and 2Y when the image is captured by the camera 1. The processor 6 is realized, for example, by employing a memory that stores a program describing the above-mentioned process, and a microprocessor that reads the program from the memory and executes the program. In addition, part of or whole of the processor 6 may be substituted by an electronic circuit used only for the above-mentioned process.

In the processor 6, a handshake detector 11 is a first processor that calculates the hand-shake amount and the hand-shake direction on the basis of the angular velocity data indicating the movement of the image capturing element $1a$. An image corrector 12 is a second processor that performs a hand-shake correction process on image data of each partial image on the basis of the hand-shake direction and the hand-shake amount calculated by the hand-shake detector 11.

A control circuit 7 controls the sampling circuit 3, the driver circuit 4, and the processor 6. The control circuit 7 applies instructions such as the initiation and termination of various operations.

In addition, the memory 5 and the processor 6 constitute a correction device for a hand-shake. The memory 5, which is part of the hand-shake correction device, functions as a first storage, which stores image data $5b$ of an image captured by the image capturing element $1a$, and a second storage, which stores movement data (the gyro data $5a$ in the first embodiment) indicating the movement of the image capturing element in a direction perpendicular to an optical axis of the image capturing element $1a$ when the image is captured by the image capturing element $1a$. In addition, the processor 6, which is part of the hand-shake correction device, performs a hand-shake correction process on the image data of each of partial images, which are obtained by dividing the image data $5b$ stored in the first storage into a plurality of partial areas, so as to compensate the movement of the image capturing element $1a$ on the basis of movement data indicating the movement of the image capturing element $1a$ stored in the second storage.

Figure 6:
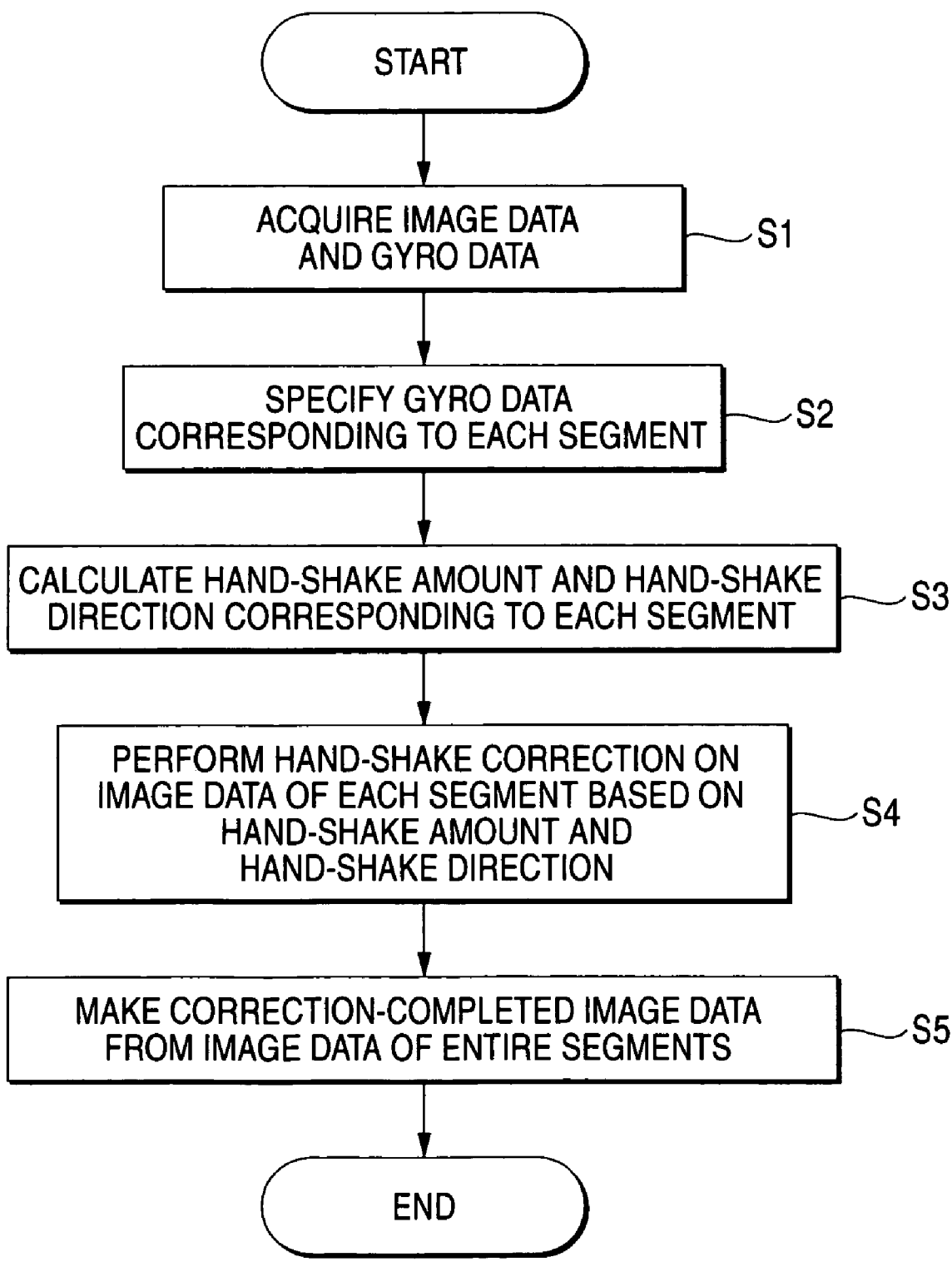
FIG. 6 is a flow chart for explaining the operation of the capturing device according to the first embodiment of the present invention.

Next, the operation of the above-mentioned device will now be described in reference to FIG. 6.

First, when a capturing instruction is input to a manipulator (not shown), the control circuit 7 applies a capturing start instruction to the driver circuit 4 and, at the same time, a sampling start instruction to the sampling circuit 3 in response to the capturing instruction.

The driver circuit 4 generates a frame synchronization signal having the same frequency as a predetermined frame rate. When the driver circuit 4 receives the capturing start instruction, a capturing operation is initiated at a lead timing of an image obtained from the frame synchronization signal. The driver circuit 4 controls the image capturing element $1a$ of the camera 1 to perform a rolling shutter operation, acquires image data $5b$ corresponding to the image an a sheet and stores the image data $5b$ in the memory 5 (step S1).

In the first embodiment, during the rolling shutter operation, an interval between the reset timing of the (n)-th line $1c$ and the reset timing of the (n+1)-th line $1c$ is equal to, for example, a reciprocal of the sampling rate of the sampling circuit 3.

After receiving the sampling start instruction, the sampling circuit 3 detects start timing of the capturing operation of the driver circuit 4, generates the gyro data $5a$ on the basis of detection values of the sensors 2X and 2Y, which are obtained during a time period for which an image on a sheet is captured from the start timing, and stores the gyro data $5a$ in the memory 5 (step S1).

Next, the control circuit 7 supplies the hand-shake correction process instruction to the processor 6.

The hand-shake detector 11 of the processor 6 refers to the gyro data $5a$ and the image data $5b$ stored in the memory 5, specifies image data $5b$ corresponding to a predetermined number of partial areas (hereinafter, referred to as segments) from the image data $5b$ corresponding to the image and, at the same time, specifies gyro data $5a$ detected from the sensors 2X and 2Y during a capturing time period of each segment (step S2).

Figure 7:
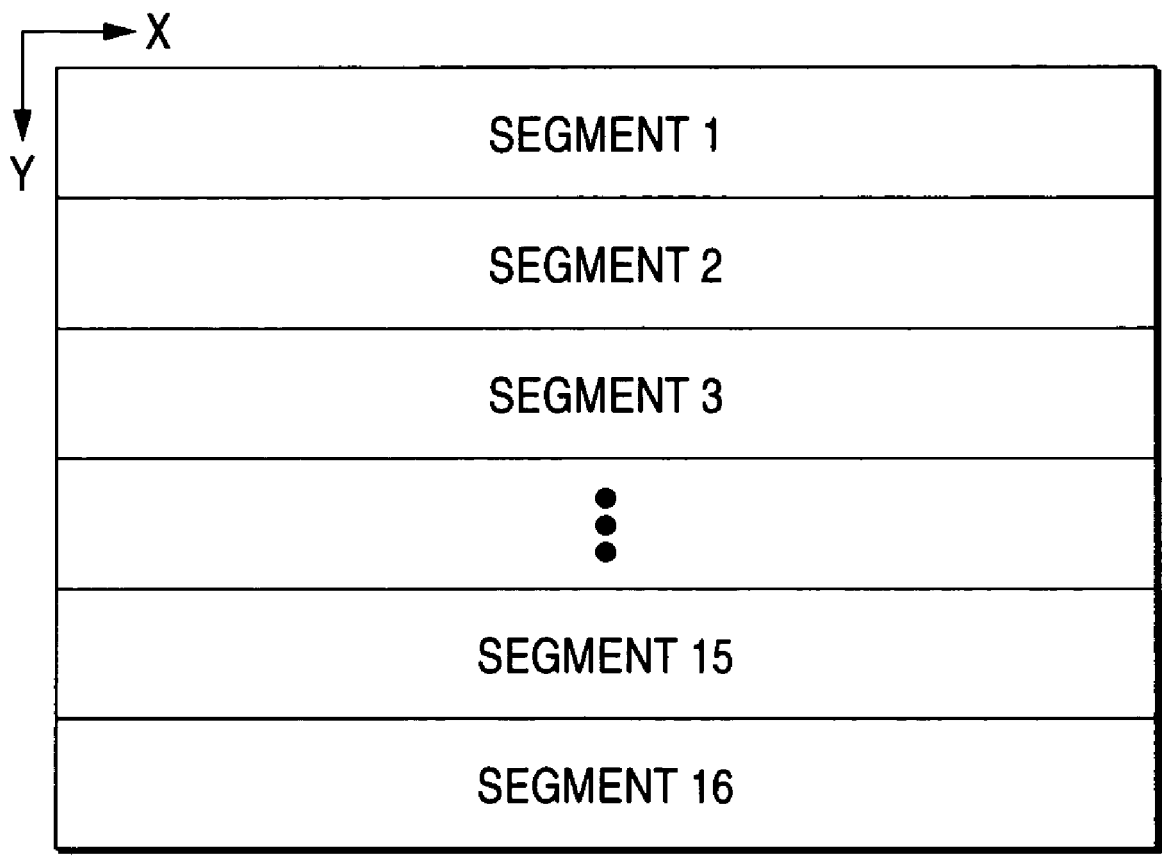
FIG. 7 is a diagram showing an example of segments in the first embodiment.

In the first embodiment, the number of segments is obtained by dividing the sampling rate by the frame rate. For example, when the sampling rate is 240 [1/sec] and the frame rate is 15 [1/sec], the number of segments is equal to 16. FIG. 7 shows a case where the number of segments is 16 in the first embodiment. As shown in FIG. 7, the segments are arranged in a direction equivalent to the moving direction of the opening of the rolling shutter within the image. In this case, each segment consists of single or plural lines.

The hand-shake detector 11 of the processor 6 calculates the hand-shake amount and the hand-shake direction for each segment on the basis of the gyro data $5a$ detected during the capturing time period of each segment (step S3).

In the first embodiment, since the RAW data of the sensors 2X and 2Y is stored as the gyro data $5a$ in the memory 5, a value of each sample of the gyro data $5a$ is converted to an angular velocity value. At this time, according to Equations (1) and (2), the angular velocity values ωx and ωy around the X-axis and Y-axis with respect to each sample are calculated from the gyro data 5a.

$$(gx - gx0) \cdot QS = \omega x \cdot F \cdot A \quad (1)$$

$$(gy - gy0) \cdot QS = \omega y \cdot F \cdot A \quad (2)$$

Here, gx and gy [bit level] indicate sample values of X-axis and Y-axis of the gyro data 5a, and gx0 and gy0 [bit level] indicate sample values of X-axis and Y-axis of the gyro data 5a when the angular velocity is equal to zero. In addition, QS [mV/bit level] indicates a quantization step of the sampling circuit 3. F[mV/deg/sec] indicates a conversion coefficient. A indicates an amplification degree in the sampling circuit 3.

Next, a rotational angle θx around the X-axis of each segment and a rotational angle θy around the Y-axis of each segment are calculated from the angular velocity values ωx and ωy of samples corresponding to the respective segments. At this time, according to Equations (3) and (4), the rotational angle θx around X-axis of each segment and the rotational angle θy around Y-axis of each segment are calculated.

[Equation 1]

$$\theta_x = \sum_{i=Ns}^{Ne} 0.5 \times (\omega_x(i) + \omega_x(i+1)) \times \frac{1}{240} \quad (3)$$

[Equation 2]

$$\theta_y = \sum_{i=Ns}^{Ne} 0.5 \times (\omega_y(i) + \omega_y(i+1)) \times \frac{1}{240} \quad (4)$$

Here, Ns indicates a sample number of a first sample corresponding to a segment. Ne indicates a sample number of a last sample corresponding to a segment. ωx(i) indicates a sample value of a sample number i. A value (1/240) in the Equation indicates a reciprocal of the sampling rate. In this case, even though the equations are formulated with a constant angular velocity, a problem will not occur if the sampling rate is set to be sufficiently high.

The handshake amount Dm and the hand-shake direction θm on the image that are caused by the hand-shake are calculated from the rotational angle θx around X-axis of each segment and the rotational angle θy around Y-axis of each segment. At this time, according to Equation (5), the handshake vector M on the image is calculated, such that the magnitude of the hand-shake vector M becomes the hand-shake amount Dm, and the direction of the hand-shake vector M becomes the hand-shake direction θm.

[Equation 3]

$$\begin{bmatrix} M_x \\ M_y \end{bmatrix} = \begin{bmatrix} \frac{1}{Sx} \cdot \frac{\sin\theta_y \cdot (\Delta x^2 / F + F)}{\sin\theta_y \cdot \Delta x / F + \cos\theta_y} \\ \frac{1}{Sy} \cdot \frac{\sin\theta_x \cdot (\Delta y^2 / F + F)}{\sin\theta_x \cdot \Delta y / F + \cos\theta_x} \end{bmatrix}, \quad (5)$$

$$\Delta x = Sx \cdot |x - x0|, \quad \Delta y = Sy \cdot |y - y0|$$

Here, x indicates a pixel position in an X-axis direction when a bottom-left corner of the image is set to (0, 0), and y indicates a pixel position in a Y-axis direction when a bottom-left corner of the image is set to (0, 0). x0 indicates a main point position in the X-axis direction when a bottom-left corner of the image is set to (0, 0), and y0 indicates a main point position in the Y-axis direction when a bottom-left corner of the image is set to (0, 0). For example, (x, y) is a central position of a segment. Referential symbol 'Sx' indicates a scaling factor in the X-axis direction of the lens of the camera 1, referential symbol 'Sy' indicates a scaling factor in the Y-axis direction of the lens of the camera 1, and referential symbol 'F' indicates a focal length of the lens of the camera 1.

Equation (5) is the formulation of a change of a subject image as viewed from a viewing point when the viewing point rotates around the X-axis and the Y-axis by the use of a projection matrix CP of a weak perspective camera model.

As shown in FIG. 8, the hand-shake amount and the hand-shake direction are obtained from the gyro data 5a shown in FIG. 3 according to Equations (1) to (5) when the frame rate is 15 [1/sec], the sampling rate is 240 [1/sec], and the number of segments is 16.

In FIG. 8, the gyro data 5a whose sample numbers range from 333 to 349 is used for the segment 1. For example, when QS=0.8056, F=0.67, A=8, and gx0=1540.566 in case of the segment 1, the gyro data 5a whose sample number is 333 has a sample value of 1539. Thus, the angular velocity ωx for the sample number is equal to −0.2353 [deg/sec] according to Equation (1).

In this case, according to Equations (1) to (4), θx=0.11.3002 [deg] and θy=0.01527 [deg]. According to Equation (5), an X-axis component Mx of the hand-shake vector M is Mx=1.928596 [pixel], and a Y-axis component My of the hand-shake vector M is My=0.257200 [pixel]. Accordingly, the hand-shake amount Dm of the segment 1 and the hand-shake direction θm of the segment 1 are calculated from Mx and My as follows: Dm=2 [pixel] and θm=7.59 [deg]. In addition, the hand-shake direction θm indicates an angle measured from X-axis.

Thus, the hand-shake amount Dm of each segment and the hand-shake direction θm of each segment are calculated (step S3).

Next, an image corrector 12 of the processor 6 performs a hand-shake correction process on image data of each segment on the basis of the hand-shake amount Dm of each segment and the hand-shake direction θm of each segment (step S4). The image corrector 12 sets image data consisting of partial image data of the entire segments, which are subjected to the hand-shake correction process on the basis of the hand-shake amount Dm and the hand-shake direction θm, as correction-completed image data 5c for the image data 5b concerning the image on a sheet, and stores the correction-completed image data in the memory 5 (step S5).

Figure 9:
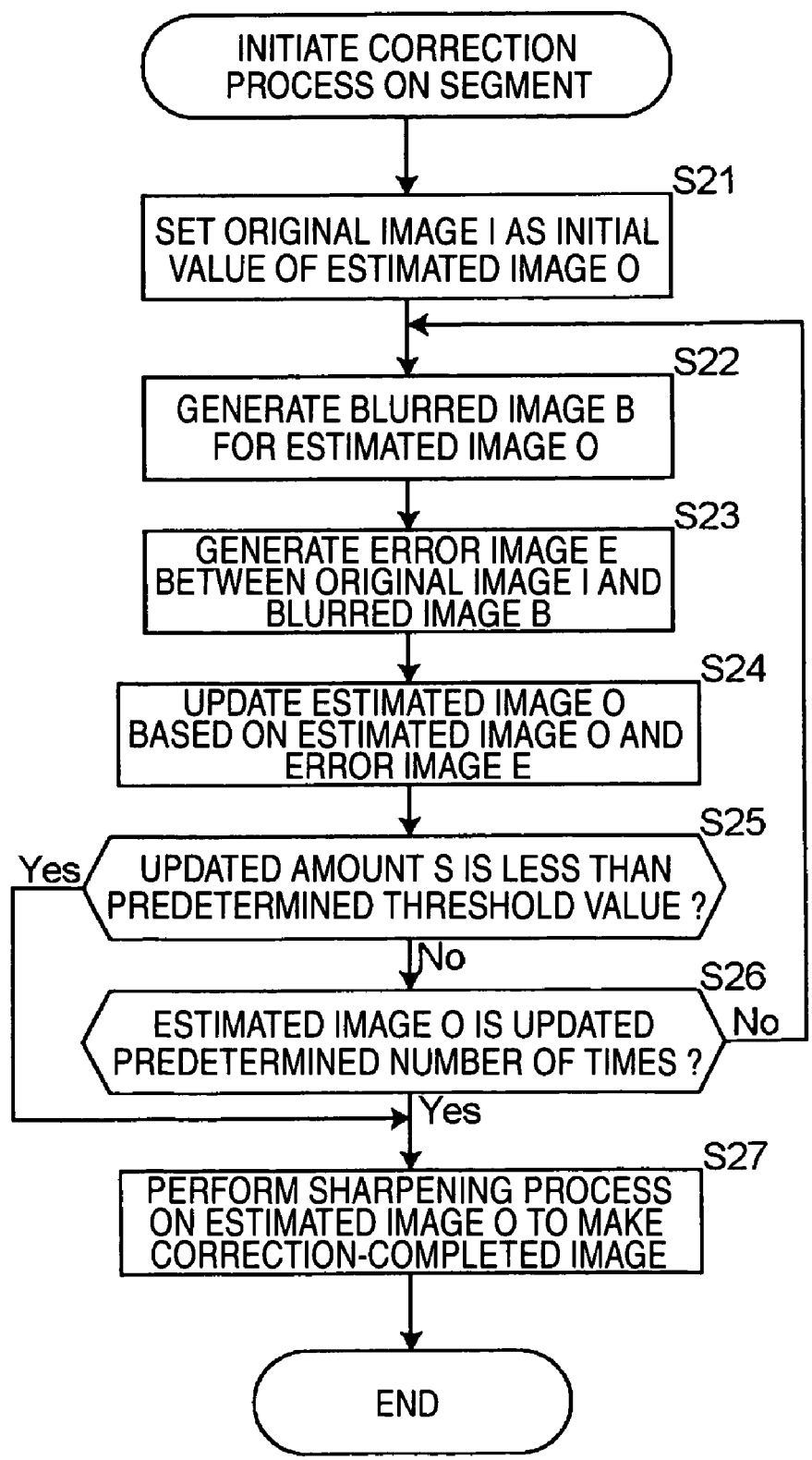
FIG. 9 is a flow chart for explaining a hand-shake correction process in FIG. 6.

Here, a hand-shake correction process on image data of each segment at step S4 will now be described in detail in reference to FIG. 9.

The image corrector 12 determines whether or not the hand-shake amount Dm is greater than a predetermined threshold value in each segment. If the hand-shake amount Dm is greater than the threshold value, the image corrector 12 determines that the segment will be subjected to the following hand-shake correction process. If the hand-shake amount Dm is less than the threshold value, the image corrector 12 determines that the segment will not be subjected to the following hand-shake correction process.

When the hand-shake amount Dm is greater than the threshold value, the image corrector 12 performs the hand-shake correction process on the segment as follows.

The image corrector 12 sets image data 5b, which is acquired from a segment by the camera 1 and the driver circuit 4, as a hand-shake image I(x, y), and sets the hand-shake image I(x, y) as an initial value of an estimated image O(x, y) (step S21).

The image corrector 12 generates a filter H(i, j), which blurs an image in a hand-shake direction, on the basis of the hand-shake amount Dm and the hand-shake direction θm of the segment.

The horizontal and vertical sizes of the filter H(i, j) are set to be greater than that of a pixel having the hand-shake amount Dm. In addition, in a matrix of the filter H(i, j), a central element, and an element (a single element for a single row or a single column) of the hand-shake direction θm from the center have a constant value a1, an element next to the element by one column or one row has a constant value a2, and the remaining elements have a value of zero. The constant values a1 and a2 have positive values that are proportional to a reciprocal of the hand-shake amount Dm, and are set to have the following relationship, i.e., a1+a2=1/Dm. FIG. 10 shows the filter H when Dm=5 and θm=54 degrees.

Next, the image corrector 12 generates a blurred image B for an estimated image O by applying the filter H to the estimated image O (step S22).

The image corrector 12 generates an error image E(x, y) by subtracting the blurred image B from the hand-shake image I (step S23). The image corrector 12 blurs an edge of the error image E(x, y) by applying the filter H to the generated error image E(x, y).

The image corrector 12 generates an edge intensity matrix W(x, y) according to Equations (6), (7), and (8). In addition, the image corrector 12 standardizes the edge intensity matrix W(x, y). That is, values of the entire elements of W(x, y) are converted to a first-order equation such that the maximum value becomes 1 and the minimum value becomes 0 among the entire elements of W(x, y). Thus, the values of the entire elements range from 0 to 1.

[Equation 4] (6)
$$dx(x, y) = O(x, y) \otimes \begin{bmatrix} -1 & -2 & -1 \\ 0 & 0 & 0 \\ 1 & 2 & 1 \end{bmatrix}$$

[Equation 5] (7)
$$dy(x, y) = O(x, y) \otimes \begin{bmatrix} -1 & 0 & 1 \\ -2 & 0 & 2 \\ -1 & 0 & 1 \end{bmatrix}$$

The operators on the right side of Equations (6) and (7) indicate convolution.

$$W(x, y) = \cos(\theta m) \cdot dx(x, y) + \sin(\theta m) \cdot dy(x, y) \quad (8)$$

The image corrector 12 updates the estimated image O(x, y) according to Equation (9) by the use of the edge intensity matrix W(x, y) after the standardization (step S24)

$$O(x, y) = O(x, y) + \beta \times E(x, y) \times W(x, y) \quad (9)$$

Here, β is a positive constant, which controls the convergent speed of a value of the estimated image O. The value of β is determined on the basis of the hand-shake amount Dm and the hand-shake direction θm. β is a positive constant less than $(2/(\lambda^2))$, for example, on the basis of the maximum singular value λ of the filter H.

The image corrector 12 determines whether or not an updated amount S is less than a predetermined threshold value (step S25).

When the updated amount S is less than a predetermined threshold value, the image corrector 12 terminates updating of the estimated image O, performs a sharpening process, which emphasizes an edge on the estimated image O, in the hand-shake direction θm, and sets the image, which is subjected to the sharpening process, as a correction-completed image of the segment (step S27). The updated amount S is calculated according to Equation (10).

[Equation 6] (10)
$$S = \sum_y \sum_x [\beta \times E(x, y) \times W(x, y)]$$

On the other hand, when the updated amount S is greater than the predetermined threshold value, the image corrector 12 determines whether to update the estimated image O a predetermined number of times (for example, five times) (step S26). When the estimated image O is determined to have been updated the predetermined number of times, the image corrector 12 performs a sharpening process to emphasize an edge on the estimated image O, and sets the image, which is subjected to the sharpening process, as a hand-shake correction-completed image of the segment (step S27).

When the updated amount S of this time is less than the predetermined threshold value and the estimated image O is not determined to have been updated the predetermined number of times, the image corrector 12 performs the steps S22 to S26 repeatedly until the updated amount S is less than a predetermined threshold value or the estimated image O is updated the predetermined number of times.

Figure 11:
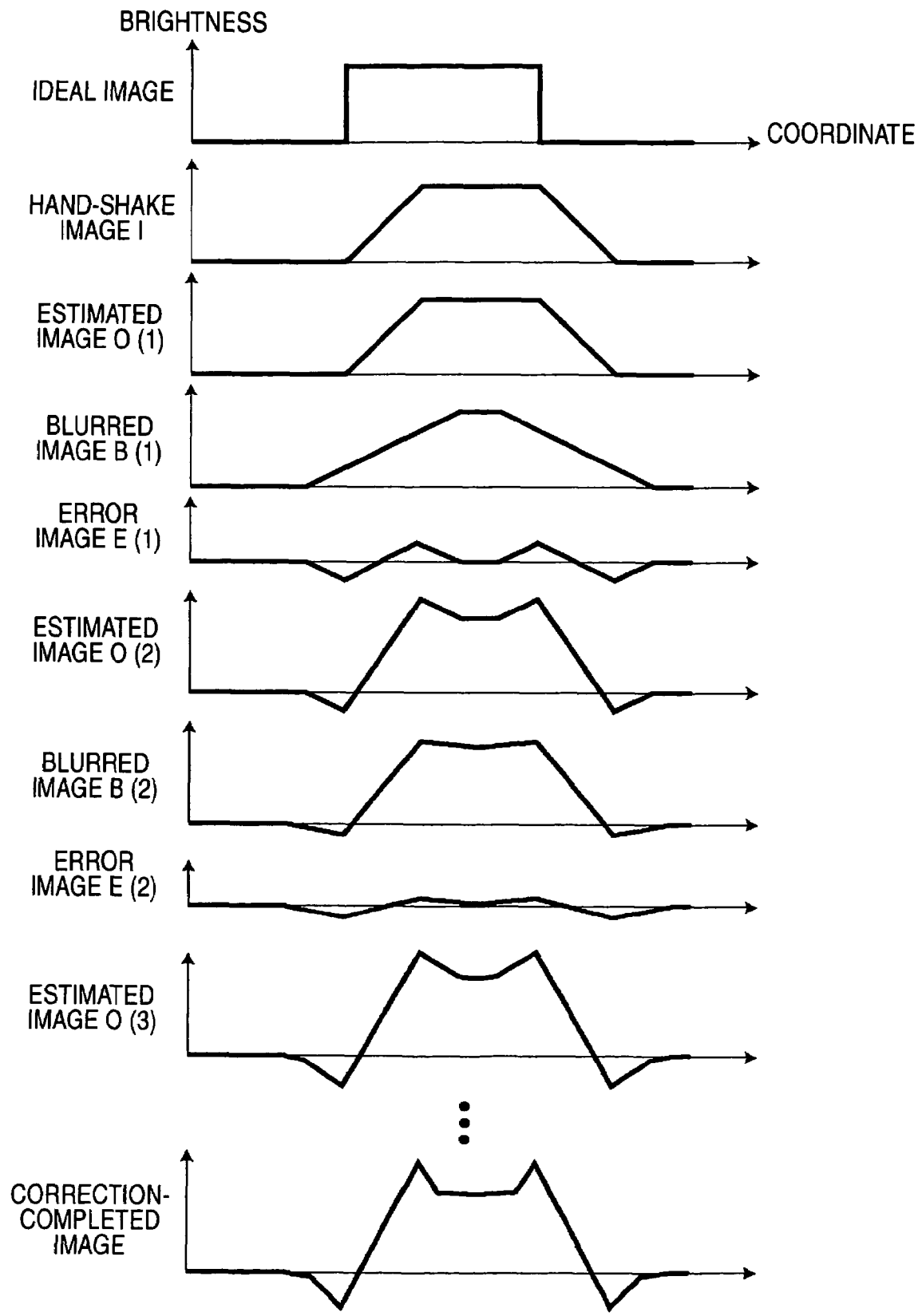
FIG. 11 is a diagram showing a hand-shake correction process of a segment in the first embodiment.

As shown in FIG. 11, the estimated image O approaches to an ideal image as it is updated on the basis of the error image E.

In this way, the image corrector 12 performs the hand-shake correction process on each segment.

According to the first embodiment, the sensors 2X and 2Y detect the movement of the image capturing element 1a in a direction perpendicular to the optical axis of the image capturing element 1a. The processor 6 performs a hand-shake correction process on image data of each of partial images, which are obtained by dividing an image on a sheet captured by the image capturing element 1a into a plurality of partial areas, so as to compensate the movement of the image capturing element 1a on the basis of movement data indicating the movement of the image capturing element 1a detected by the sensors 2X and 2Y when the image is captured by the image capturing element 1a.

Thus, since the hand-shake correction process is performed on each partial area of the image on a sheet, it is possible to correct the hand-shake even though the hand-shake amount and the hand-shake direction are not constant for each part of the image.

In particular, in the image capturing device according to the first embodiment, the driver circuit 4 changes a capturing timing every single or plural lines of the image capturing element 1a, and acquires image data from each line to realize the rolling shutter. Owing to the rolling shutter, it is possible to correct the hand-shake even though the hand-shake amount and the hand-shake direction are not constant for each part of the image on a sheet.

In addition, according to the first embodiment, the processor 6 performs a hand-shake correction process on image data of each of partial images, which are obtained by dividing the sampling rate upon detection of the movement of the image capturing element 1a detected by the sensors 2X and 2Y by the frame rate of the image capturing element 1a and the driver circuit 4.

Thus, it is possible to obtain at least one gyro data 5a from each partial area, and to perform the hand-shake correction process on each partial area.

In addition, according to the first embodiment, the sampling circuit 3 stores the gyro data 5a detected from the sensors 2X and 2Y in the memory 5 in association with capturing timing for each partial area of an image on a sheet by the image capturing element 1a.

By this, it is possible to reliably match the image data of each partial area with the gyro data 5a, and to perform the hand-shake correction process on each partial area.

According to the first embodiment, in the processor 6, the hand-shake detector 11 calculates the hand-shake amount and the hand-shake direction of the image capturing element 1a from the gyro data 5a, and the image corrector 12 performs the hand-shake correction process on image data of each partial image on the basis of the hand-shake amount and the hand-shake direction of the image capturing element 1a, which are obtained by the hand-shake detector 11.

Thus, since the hand-shake correction process is performed on each partial area in the hand-shake direction, it is possible to reliably perform the hand-shake correction on each partial area.

According to the first embodiment, the image corrector 12 repeatedly performs an estimated image update process, in which an original image captured by the image capturing element 1a is set to an initial estimated image and the estimated image is updated on the basis of an error image between the original image and a blurred image obtained by blurring the estimated image in the hand-shake direction, until a predetermined condition is satisfied, and performs a sharpening process on the estimated image in the hand-shake direction.

Thus, it is possible to reduce an effect caused by the hand-shake on an edge of an image in each partial area and to reliably perform the hand-shake correction.

In addition, according to the first embodiment, the sensor 2X is identified as a first gyro sensor, which is fixed within a housing of the image capturing device and detects angular velocity of the image capturing element 1a around the X-axis perpendicular to an optical axis of the image capturing element, and the sensor 2Y is identified as a second gyro sensor, which is fixed within the housing of the image capturing device and detects angular velocity of the image capturing element 1a around the Y-axis perpendicular to the optical axis of the image capturing element, and the X-axis.

Thus, it is possible to make the movement detector smaller by using the gyro sensor, and to realize the hand-shake correction even though the housing of the image capturing device is small.

In addition, according to the first embodiment, the processor 6 calculates a first rotational angle θx of the image capturing element around a first axis and a second rotational angle θy of the image capturing element around a second axis according to the product of a plurality of angular velocities detected corresponding to the capturing time period of partial images and the sampling rate of the angular velocity, and calculates the amount Dm and the hand-shake direction θm on the basis of the first and second rotational angles θx and θy.

Thus, when a plurality of angular velocity data is obtained on each partial area, it is possible to obtain more accurate hand-shake amount and hand-shake direction.

Second Embodiments

The second embodiment of the present invention is a mobile phone equipped with a camera to which the image capturing device according to the first embodiment is applied.

A mobile phone equipped with a camera according to the second embodiment includes in its housing the image capturing device shown in FIG. 1. The camera 1 is fixed to the housing, a member provided in the housing, and a circuit board fixed to the housing. The sensors 2X and 2Y are also fixed to the housing, the member provided in the housing, and the circuit board fixed to the housing. In addition, it is possible to make the sensors 2X and 2Y fixed to a case of the camera 1.

As described above, it is possible to provide the sensors 2X and 2Y in a narrow housing by the use of a compact, thin gyro sensor.

In addition, other configuration and operation of the mobile phone equipped with a camera according to the second embodiment are the same as those of the image capturing device according to the first embodiment, and a detailed description thereof will thus be omitted herein.

The mobile phone according to the second embodiment includes an image capturing element 1a, a sensor 2X, which is a first gyro sensor and is fixed within the housing and detects angular velocity of the image capturing element 1a around the X-axis perpendicular to an optical axis of the image capturing element 1a, a sensor 2Y, which is a second gyro sensor and is fixed within the housing and detects angular velocity of the image capturing element around the Y-axis perpendicular to the optical axis of the image capturing element 1a and the X-axis, and a processor that performs a hand-shake correction process on image data of each of partial images, which are obtained by dividing an image on a sheet captured by the image capturing element 1a into a plurality of partial areas, on the basis of the angular velocity of the image capturing element 1a detected by the sensors 2X and 2Y when the image is captured by the image capturing element 1a. The image capturing element 1a and the sensors 2X and 2Y are fixed within the housing of the mobile phone (not shown).

Thus, by the use of the gyro sensor, it is possible to detect the movement of the image capturing element in a narrow housing of the mobile phone. Further, since the hand-shake correction can be easily realized and can be performed on each partial area of the image on a sheet, it is possible to correct the handshake even though the hand-shake amount and the hand-shake direction are not constant for each part of the image on a sheet.

Since the mobile phone is formed in a housing shape to function mainly as a phone, the hand-shake is likely to occur. Accordingly, it is possible to obtain a significant effect by performing the above-mentioned hand-shake correction process.

In addition, the present invention is not limited to the above-mentioned embodiments, but various modifications in form and details may be made in the present invention without departing from the scope of the present invention.

For example, even though the hand-shake correction process is performed on the basis of the movement in two directions, i.e., the X-axis and the Y-axis, in the above-mentioned embodiments, it is possible to effectively perform the hand-shake correction on the basis of the movement in one direction when the hand-shake direction is limited to only one direction. Even though the hand-shake direction is only one direction, it is possible to perform the hand-shake correction on each segment as described above when the velocity of hand-shake varies with time.

Although the angular velocity data is used as the movement data in the above-mentioned embodiments, other physical quantity indicating the movement may be used.

In addition, in the above-mentioned embodiments, the time interval between lines of reset timing of the rolling shutter may be a term for which at least one sample of the gyro data $5a$ is obtained within the exposure time of one segment.

In addition, the image capturing device according to the above-mentioned embodiments can be applied to not only a mobile phone but also a mobile terminal, such as a personal digital assistant (PDA) having an image capturing function and a mobile personal computer.

Further, even though the rolling shutter is used in the above-mentioned embodiments, a mechanical shutter may be used.

The present invention can be applied to a digital still camera, a mobile phone equipped with a camera, and the like.

What is claimed is:

1. An image capturing device, adapted to capture an object image and to generate an image data, the image capturing device comprising:
    a plurality of image capturers, each of which is adapted to perform an image capturing of a part of the object image and to generate a partial image data which constitutes a part of the image data based on the part of the object image, each of the image capturers having an optical axis;
    a detector, operable to detect movement of each of the image capturers in a direction perpendicular to the optical axis during the image capturing and to generate movement data based on the detected movement, for each of the image capturers; and
    a processor, operable to correct the partial image data so as to compensate the movement during the image capturing based on the movement data,
    wherein
    the image capturers are divided into a plurality of groups each of which includes at least one of the image capturers,
    each of the image capturers belonging to different ones of the groups performs the image capturing at different timing, and
    the number of the groups is obtained by dividing a sampling rate at which the detector detects the movement by a frame rate related to timing of the image capturing performed by each of the image capturers belonging to different ones of the groups.

2. The image capturing device according to claim 1, further comprising
    a first storage, storing the partial image data; and
    a second storage, storing the movement data in association with time at which each of the image capturers performs the image capturing.

3. The image capturing device according to claim 1, wherein
    the processor includes:
    a first processor, calculating a correction value and a correction direction in association with the movement data; and
    a second processor, correcting the partial image data in association with the correction value and the correction direction.

4. The image capturing device according to claim 3, wherein an original image captured by the image capturing is set as an initial estimated image,
    the second processor repeatedly updates the estimated image in association with an error image that is based on the original image and a blurred image, where the blurred image is the estimated image that was blurred in the correction direction, wherein the update is repeated until the estimated image is a predetermined image having a predetermined condition, and
    the second processor performs a sharpening process on the predetermined image in the correction direction.

5. The image capturing device according to claim 1, wherein
    the detector includes:
    a first gyro sensor, operable to detect a first angular velocity of each of the image capturers around a first axis that is perpendicular to the optical axis; and
    a second gyro sensor, operable to detect a second angular velocity of each of the image capturers around a second axis that is perpendicular to the optical axis and the first axis.

6. The image capturing device according to claim 5, wherein
    the processor calculates a first rotational angle of the image capturer around the first axis in association with the first angular velocity and a second rotational angle of the image capturer around the second axis in association with the second angular velocity, and
    the processor calculates a correction value and a correction direction in association with the first rotational angle and the second rotational angle.

7. A correction device, adapted to correct image data corresponding to an object image, the correction device comprising:
    a first storage, storing partial image data each of which constitutes a part of the image data and is generated by each of image capturers having an optical axis;
    a second storage, storing movement data each of which is based on movement of each of the image capturers in a direction perpendicular to the optical axis during an image capturing of a part of the object image performed by each the image capturers for each of the image capturers; and
    a processor, correcting each of the partial image data stored in the first storage so as to compensate the movement of each of the image capturers based on each of the movement data stored in the second storage,
    wherein
    the image capturers are divided into a plurality of groups each of which includes at least one of the image capturers,
    each of the image capturers belonging to different ones of the groups performs the image capturing at different timing, and
    the number of the groups is obtained by dividing a sampling rate at which the movement is detected by a frame rate related to timing of the image capturing performed by each of the image capturers belonging to different ones of the groups.

8. A mobile phone, operable to capture an object image and to generate an image data, the mobile phone comprising:
    a plurality of image capturers, each of which is fixed in a housing and is adapted to perform an image capturing of a part of the object image and to generate a partial image data which constitutes a part of the image data based on the part of the object image, each of the image capturers having an optical axis;

a first gyro sensor, fixed in the housing, and operable to detect a first angular velocity of each of the image capturers around a first axis that is perpendicular to the optical axis during the image capturing;

a second gyro sensor, fixed in the housing, and operable to detect a second angular velocity of each of the image capturers around a second axis that is perpendicular to the optical axis and the first axis during the image capturing; and a processor, correcting the partial image data in association with the first angular velocity and the second angular velocity, wherein the image capturers are divided into a plurality of groups each of which includes at least one of the image capturers, each of the image capturers belonging to different ones of the groups performs the image capturing at different timing, and the number of the groups is obtained by dividing a sampling rate at which the first gyro sensor and the second gyro sensor detect the first and second angular velocity, respectively, by a frame rate related to timing of the image capturing performed by each of the image capturers belonging to different ones of the groups.

9. A correcting method for image data corresponding to an object image, the correcting method comprising:

performing an image capturing of a part of the object image by each of image capturers having an optical axis, generating a partial image data which constitutes a part of the image data based on the part of the object image, detecting movement of each of the image capturers in a direction perpendicular to the optical axis;

generating movement data based on the detected movement; and correcting the partial image data so as to compensate the movement during the image capturing based on the movement data, wherein the image capturers are divided into a plurality of groups each of which includes at least one of the image capturers, each of the image capturers belonging to different ones of the groups performs the image capturing at different timing, and the number of the groups is obtained by dividing a sampling rate at which the movement is detected by a frame rate related to timing of the image capturing performed by each of the image capturers belonging to different ones of the groups.

* * * * *